Nov. 22, 1938.  J. W. CUNNINGHAM  2,137,527
MECHANISM FOR DISPENSING BEVERAGES
Filed Oct. 13, 1937  2 Sheets—Sheet 1
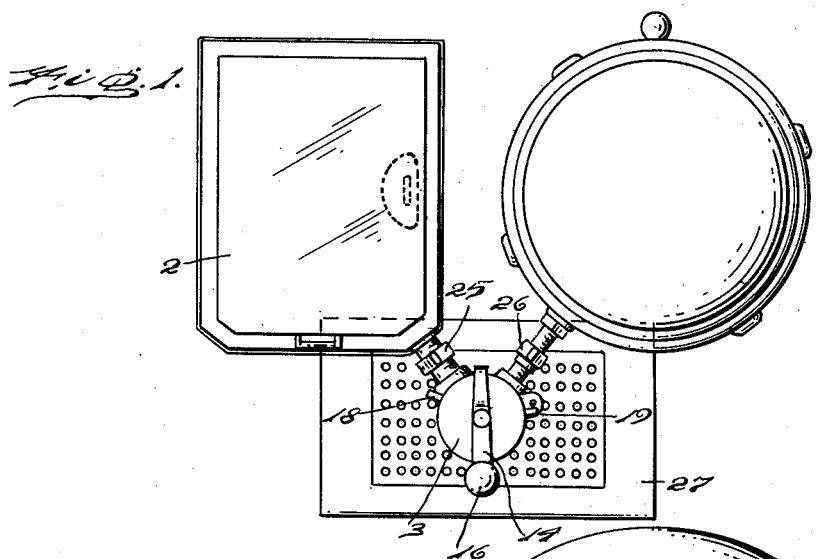
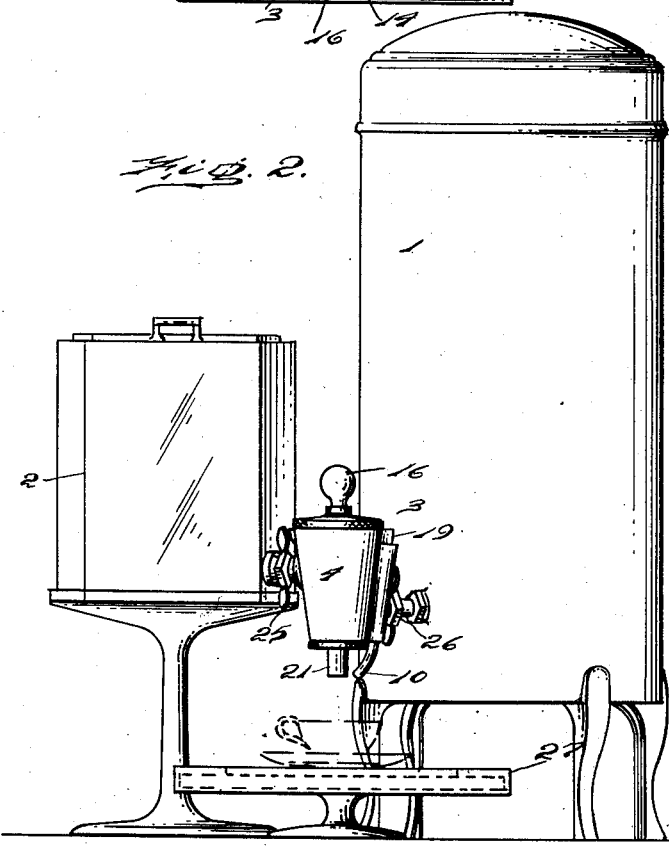
INVENTOR
James W. Cunningham
BY
Herbert S. Fairbanks
ATTORNEY

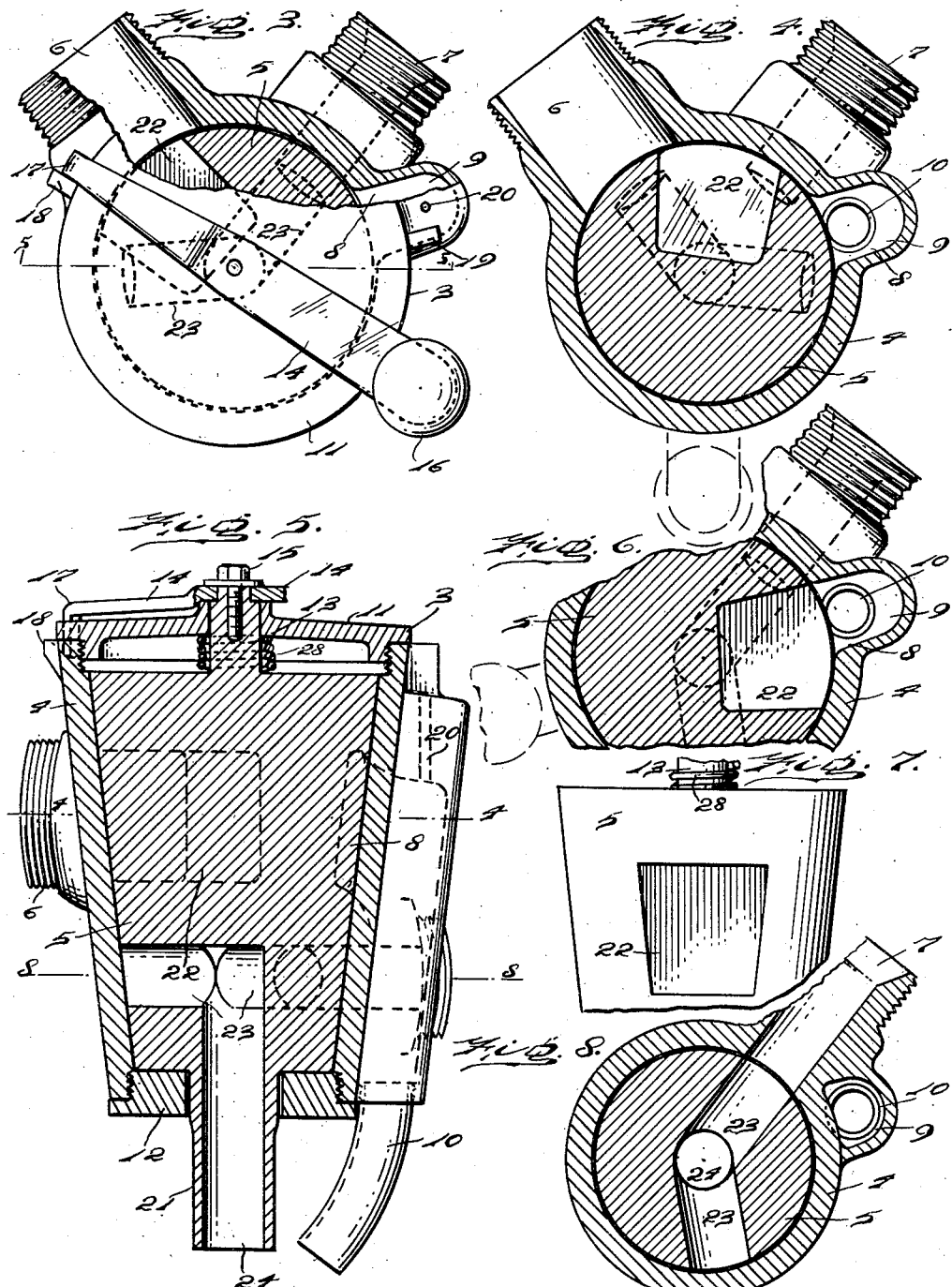

Patented Nov. 22, 1938

2,137,527

UNITED STATES PATENT OFFICE 2,137,527

MECHANISM FOR DISPENSING BEVERAGES

James W. Cunningham, Haddon Heights, N. J., assignor to Horn and Hardart Baking Co., Philadelphia, Pa., a corporation of New Jersey Application October 13, 1937, Serial No. 168,823

4 Claims. (Cl. 225—21)

In hotels and restaurants where orders for coffee are delivered in cups from the service department to the dining room, it is difficult to draw the coffee as rapidly as the orders are received. This is largely due to the fact that each coffee urn and cream urn of a battery has an independent draw-off faucet. With such an arrangement, a cup is first placed on the cream faucet and then under the coffee faucet which requires two separate draw-off operations and the movement of a cup from one faucet to another.

It has heretofore been proposed to employ a single draw-off faucet to control the delivery of coffee and cream but these have not been entirely satisfactory because the proper proportions of coffee and cream were not maintained and the cream did not properly blend with the coffee during the draw-off operation.

The cream in the cream urn is maintained in a cool or cold condition and if this cold cream comes into contact with the hot coffee there is a tendency to cool the coffee. In accordance with this invention the draw-off faucet is heated by heat conductivity from the coffee urn so that the wall of the cream measuring pocket in the valve plug is maintained in a heated condition, and the cream discharging from the measuring pocket is further heated in its passage through the cream discharge passage, the walls of which are maintained in a heated condition by the heat conductivity of the valve connection to the coffee urn and of the body.

A further object of the invention is to simultaneously discharge a measured quantity of heated cream into the stream of coffee being discharged in order to obtain a more perfect blending of the cream with the coffee.

The object therefore of this invention is to devise a novel method of and mechanism for dispensing beverages wherein one or more beverages as desired may be rapidly dispensed.

With the above and other objects in view as will hereinafter clearly appear, my invention comprehends a novel method of and mechanism for dispensing one or more beverages.

It further comprehends a novel beverage dispensing mechanism wherein the draw-off faucet connections are disposed at an angle instead of being at the front of their respective urns, and a single draw-off faucet of novel construction is provided for both the coffee and the cream urn and is adapted to dispense coffee with or without cream, at the will of the operator.

It further comprehends a novel draw-off faucet, having a novel housing and a novel valve, with novel arrangements of a measuring pocket and ports and passages.

Other novel features of construction and advantage will hereinafter more clearly appear in the detailed description and the appended claims.

For the purpose of illustrating the invention, I have shown in the accompanying drawings a typical embodiment of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a top plan view of mechanism for dispensing beverages, embodying my invention.

Figure 2 is a front elevation.

Figure 3 is a top plan view partly broken away of the valve mechanism.

Figure 4 is a section on line 4—4 of Figure 5.

Figure 5 is a sectional elevation of the valve, the section being taken on line 5—5 of Figure 3.

Figure 6 is a transverse section similar to Figure 4 but showing the valve in position to dispense coffee and cream.

Figure 7 is an elevation of a portion of the valve.

Figure 8 is a transverse section on line 8—8 of Figure 5.

Similar numerals of reference indicate corresponding parts.

Referring to the drawings:—

The equipment for making coffee in hotels and restaurants usually comprises a battery of urns, consisting of a coffee urn 1, a hot water urn (not shown) and a cream urn 2.

The coffee is made by drawing very hot or boiling water from the hot water urn and pouring it into the coffee urn above the coffee therein. A single valve mechanism 3 is employed to withdraw a measured quantity of cream from the cream urn and coffee from the coffee urn. This valve mechanism 3 has a valve body 4 and a valve 5 of novel construction.

The valve body 4 has a cream inlet 6 of greater diameter than its coffee inlet 7, and an elongated cream discharge recess 8 opening through inner periphery and communicating with cream discharge passage 9 in the wall of the valve body. The lower ends of the walls of discharge passage 9 terminate in a downward and inwardly inclined spout 10. The valve is conical in contour and is secured in place upper cap 11 and a lower cap 12 in threaded engagement with the body.

The valve has an upper extension 13 extending through the upper cap and provided with a valve operating arm 14 secured thereto by a fastening device 15, and having its insulated grasping portion 16 bent upwardly. The forward end of the arm 14 is bent downwardly at 17, so that during its partial rotation it may contact with the stop lugs 18 and 19 to limit the extent of rotation of the valve. The upper end of the cream passage 9 is provided with an atmospheric vent 20. The valve has a tubular extension 21, which passes through and extends below the lower cap 12.

The valve at its upper enlarged portion is recessed to form a measuring pocket 22 having closed top, rear, bottom and side walls and the front face opens throughout its entire area, through the periphery of the valve.

During the rotation of the valve, the front face of the pocket is adapted to be brought into registry with the cream inlet 6 and the elongated cream discharge recess 8.

The valve body below the measuring pocket, has circumferentially spaced apertures 23 selectively brought into registry with the coffee inlet 8, and communicating at all times with the coffee discharge passage 24 which opens through the tubular extension 21.

The cream inlet 6 is connected with the cream urn 2 by a quick detachable connection 25, and the coffee inlet 7 is connected with the coffee urn 1 by a quick detachable connection 26 of a character which will conduct heat from the coffee urn to the valve and valve body. These connections instead of being at the front of their respective urns are angularly disposed to each other and extend outwardly from the sides of their urns, so that no obstructions are present which would interfere with the placing of a cup and saucer beneath the valve.

A drain pan 27 of any desired construction, is preferably disposed beneath the valve.

The cream urn may be of any conventional type having a double wall casing with insulation between the walls and means for retaining the cream in a cool condition.

The valve may have a spring 28.

The operation of my novel beverage dispensing mechanism will now be apparent to those skilled in this art and is as follows:—

Assuming that the cream is in the cream urn, and the coffee in the coffee urn, and the valve in neutral position, the cream measuring pocket of the valve at this time is in partial registry with the cream inlet and the measuring pocket contains a measured quantity of cream. The valve mechanism when moved in one direction dispenses black coffee, and when moved in an opposite direction dispenses coffee with cream. If the valve handle is moved to clockwise, one of the apertures 23 registers with the coffee inlet and coffee will flow from the coffee urn through the inlet 7, port 23 with which it registers and discharge passage 24 until the handle is returned to its neutral position half way between the stops of the valve body.

If now, coffee with cream is desired, the grasping handle of the valve is turned counter-clockwise to effect a right hand turning of the valve, another port 23 of the valve is brought into registry with the coffee inlet 7 and coffee will flow through such port and discharge passage 24. At the same time, the cream measuring pocket communicates with the elongated recess 8 and cream flows freely from the measuring pocket into recess 8 and through cream discharge passage 9, passing from the spout 10 directly into the stream of coffee discharging through the discharge passage 24. As soon as the cup is filled, the operator returns the valve handle to its neutral position.

The heat from the coffee urn is conducted through the coffee connection to the valve body and valve so that they are retained in a heated condition. As soon as the cream enters the measuring pocket of the valve it is gradually warmed, and as it passes through the cream discharge passage in the boss of the valve body it becomes heated to a higher degree so that the cream will flow more freely than if it were cold and is discharged into the stream of hot coffee and not have any material cooling effect on the hot coffee.

By heating the cream before discharging it into the coffee, the coffee is improved, since the cream becomes partly emulsified and a better blending action between the cream and the coffee is obtained than has heretofore been deemed possible.

It has been found in practice that the beverage dispensing mechanism herein shown enables an attendant to serve coffee with or without cream in a rapid and efficient manner, and the coffee can be maintained at the desired standard of excellence.

The coffee has a greater head than the cream and therefore the coffee from the coffee urn has a greater gravity flow than the cream. The cream in a cold condition than the cream. The of a denser consistency than the coffee, so that I have found it advantageous to make the cream connection, and the cream inlet and outlet of greater areas than those for the coffee.

The outer face of the measuring pocket is entirely open to provide for rapid filling and discharge of the cream.

Having thus described my invention, what I claim as new and desire to secure by Letters Patent is:—

1. Beverage dispensing mechanism comprising a valve mechanism having angularly disposed, laterally extending connections adapted to be connected respectively to a coffee urn and to a cream urn, said valve mechanism having a body with a vertically disposed conical valve chamber with a cream inlet and a coffee inlet to said chamber and a cream discharge passage within its wall leading from said chamber and extending longitudinally of the body and terminating at its lower end in an inwardly deflected spout, a conical solid valve in said valve chamber having a recess forming a measuring pocket opening throughout its outer face through the periphery of the valve and communicating with the cream inlet or with said discharge passage when said valve is turned, said valve having circumferentially spaced, laterally extending apertures opening through its outer periphery to selectively register with the coffee inlet on turning of the valve, having a discharge passage in communication with said apertures, one of said apertures communicating with said coffee inlet when said measuring pocket is in communication with said cream discharge passage, and a handle for turning said valve in one direction to dispense coffee and cream and in an opposite direction to bring the other of said apertures into registry with the coffee inlet to dispense only black coffee.

2. Beverage dispensing mechanism, comprising a valve mechanism having a valve body with a valve chamber having a cream inlet adapted for connection with a cream urn and coffee inlet adapted for connection with a coffee urn and having an elongated cream outlet extending longitudinally of the body through its lower end, a solid valve in said valve chamber having a recess forming a measuring pocket opening throughout its outer face through the periphery of the valve and having circumferentially spaced laterally extending apertures opening through its outer periphery and in communication with a discharge aperture, said measuring pocket being in communication with said cream inlet when the valve is in neutral position, and means to turn the valve in one direction to bring one of said apertures in communication with the coffee inlet and at the same time said measuring pocket in communication with said cream outlet and to turn said valve in the opposite direction to bring the other of said apertures into registry with said coffee inlet to dispense only black coffee.

3. Beverage dispensing mechanism, comprising a dispensing valve mechanism having detachable, angularly disposed connections, said valve mechanism having a body with a valve chamber having a cream inlet, and a coffee inlet, the cream inlet being of greater area than the coffee inlet, spaced stops on the body, a conical valve having a recess forming a cream measuring pocket with closed top, side, rear and bottom walls and with its front face opening through the periphery of the valve and forming a filling and a delivery opening, circumferentially spaced apertures opening through the periphery of the valve and communicating with a central cream discharge passage, said body having an elongated cream receiving recess and a discharge passage terminating in an inwardly directed spout discharging below said discharge passage and a handle for said valve turnable in one direction to engage a stop to position the valve to dispense black coffee, and turnable in an opposite direction to engage the other stop to dispense coffee and cream.

4. Beverage dispensing mechanism comprising a valve having a body with angularly disposed connections adapted for connection with a coffee urn and with a cream urn and leading respectively to a coffee inlet and a cream inlet, said body having an elongated cream discharge recess opening into its bore and communicating with a vented passage extending longitudinally through the wall of the body and its bottom, and a solid valve rotatable in said body having a cream measuring pocket within it and having a common filling and delivery opening through its periphery and having angularly disposed passages through its side wall selectively cooperating with the coffee inlet and leading to a discharge passage for coffee only.

JAMES W. CUNNINGHAM.